(12) United States Patent
Johnson

(10) Patent No.: US 12,419,456 B2
(45) Date of Patent: Sep. 23, 2025

(54) SYSTEM AND METHOD FOR FILTERING A HOT BEVERAGE

(71) Applicant: BCC Product Development, L.L.C., Ormond Beach, FL (US)

(72) Inventor: Julianne Johnson, Ormond Beach, FL (US)

(73) Assignee: BCC PRODUCT DEVELOPMENT, L.L.C., Ormond Beach, FL (US)

( * ) Notice: Subject to any disclaimer, the term of this patent is extended or adjusted under 35 U.S.C. 154(b) by 747 days.

(21) Appl. No.: 17/629,850

(22) PCT Filed: Jul. 27, 2020

(86) PCT No.: PCT/US2020/043723
§ 371 (c)(1),
(2) Date: Jan. 25, 2022

(87) PCT Pub. No.: WO2021/021726
PCT Pub. Date: Feb. 4, 2021

(65) Prior Publication Data
US 2022/0272998 A1    Sep. 1, 2022

Related U.S. Application Data

(60) Provisional application No. 62/878,787, filed on Jul. 26, 2019.

(51) Int. Cl.
*A47J 31/36* (2006.01)
*A47J 31/44* (2006.01)
*A47J 31/06* (2006.01)

(52) U.S. Cl.
CPC ....... *A47J 31/3666* (2013.01); *A47J 31/4482* (2013.01); *A47J 31/0647* (2013.01)

(58) Field of Classification Search
CPC .. A47J 31/4482; A47J 31/007; A47J 31/0647; A47J 31/34; A47J 31/3666
(Continued)

(56) References Cited

U.S. PATENT DOCUMENTS 3,149,556 A * 9/1964 Martin ................. A47J 31/057
239/602
4,757,754 A * 7/1988 Welker ................. A47J 31/007
99/291

(Continued)

FOREIGN PATENT DOCUMENTS

| EP | 1498058 A1 | 1/2005 |
|---|---|---|
| EP | 2409610 A1 | 1/2012 |
| JP | 2005040605 A | 2/2005 |

OTHER PUBLICATIONS

EP20847387.6 Extended European Search Report, dated Jul. 24, 2023, 11 pages.
(Continued)

*Primary Examiner* — Reginald Alexander
(74) *Attorney, Agent, or Firm* — Wolter Van Dyke Davis, PLLC; Robert L. Wolter; Cian O'Brien

(57) ABSTRACT

A system is provided for brewing a hot beverage. The system includes a housing and a first water reservoir located at a first region of the housing. The system also includes a second water reservoir located at a second region of the housing. The system also includes a first receptacle defined by the housing that is configured to receive a first filter. The system also includes a second receptacle defined by the housing configured to receive a second filter. The system also includes a cavity defined by the housing to position one of a first container and a second container. The system is configured to brew a first or second volume of hot beverage to fill the respective first or second container based on (Continued)

placement of the respective first or second filter in the respective first or second receptacle.

20 Claims, 12 Drawing Sheets

(58) Field of Classification Search
USPC .................................................. 99/284, 291
See application file for complete search history.

(56) References Cited

U.S. PATENT DOCUMENTS

| | | | | |
|---|---|---|---|---|
| 5,829,340 | A * | 11/1998 | Yang | ..................... A47J 31/461 |
| | | | | 99/290 |
| 5,855,163 | A * | 1/1999 | DeMars | ................. A47G 19/12 |
| | | | | 392/444 |
| 6,729,226 | B2 | 5/2004 | Mangiapane | |
| 7,089,849 | B2 * | 8/2006 | Chen | ....................... A47J 31/52 |
| | | | | 99/305 |
| 7,565,860 | B1 * | 7/2009 | Liu | ......................... A47J 31/50 |
| | | | | 99/291 |
| 2005/0011364 | A1 * | 1/2005 | Chen | ...................... A47J 31/52 |
| | | | | 99/275 |
| 2005/0103203 | A1 * | 5/2005 | Takizawa | ................ A47J 31/50 |
| | | | | 99/279 |
| 2005/0150393 | A1 | 7/2005 | Biderman et al. | |
| 2006/0059922 | A1 | 3/2006 | Anderson et al. | |
| 2007/0051246 | A1 * | 3/2007 | Suzuki | ................. A47J 31/005 |
| | | | | 99/275 |
| 2014/0109771 | A1 | 4/2014 | Nakao et al. | |
| 2018/0140130 | A1 | 5/2018 | Zhou et al. | |

OTHER PUBLICATIONS

PCT/US2020/043723 International Search Report and Written Opinion, dated Oct. 13, 2020, 7 pages.
Chinese Patent Office Action dated Feb. 21, 2023 in Chinese Pat. App. No. 202080054190.9; 4 pages.
Japanese Patent Office Action dated Apr. 30, 2024 in Japanese Pat. App. No. 2022-505399; 8 pages.

* cited by examiner

SYSTEM AND METHOD FOR FILTERING A HOT BEVERAGE

CROSS REFERENCE TO RELATED APPLICATIONS

This application claims benefit of Provisional Application No. 62/878,787, filed Jul. 26, 2019, the entire contents of which is hereby incorporated by reference as if fully set forth herein, under 35 U.S.C. § 119(e).

BACKGROUND

Conventional brewers of hot beverages such as coffee brewers are available, which brew single servings of coffee (e.g. Keurig® coffee brewer). Additionally, other conventional coffee brewers are available, which brew multiple servings of coffee (e.g. a pot of coffee, such as 10-12 cups). These conventional coffee brewers typically involve placement of a coffee filter in a receptacle (e.g. Keurig K-cup® for the Keurig® coffee brewer or a paper filter containing ground coffee for the multi-cup brewers) and pumping hot water to the receptacle to brew the appropriate amount of coffee.

SUMMARY

Techniques are provided for an improved system and method for filtering hot beverages, such as coffee. The inventor noted that conventional coffee brewers have several shortcomings. For example, single cup brewers (e.g. Keurig®) typically only feature a single water reservoir along one side of the brewer, which must be continuously refilled. The inventor recognized that an improved coffee brewer featuring multiple water reservoirs along multiple sides of the brewer would reduce the need to continuously refill the water reservoir. Additionally, the inventor recognized that conventional coffee brewers have a binary mode where they some conventional brewers are designed to brew a single serving of coffee (e.g. Keurig® coffee brewer) and other conventional brewers are designed to brew multiple servings of coffee (e.g. conventional coffee brewer with a 10-12 cup pot). Thus, the inventor recognized that an improved coffee brewer would permit a user to brew either a single serving of coffee or multiple servings of coffee (e.g. in a pot) with a single brewer without needing to own two separate coffee brewers. Additionally, the inventor recognized that conventional coffee filters require additional kitchen appliances (e.g. coffee grinder, juicer, etc.) and thus the inventor recognized that an improved coffee grinder would incorporate a rotor that can serve the function of these additional kitchen appliances and thus would eliminate the need to own such additional kitchen appliances.

In a first embodiment, a system is provided for brewing a hot beverage. The system includes a housing and a first water reservoir located at a first region of the housing. The system also includes a second water reservoir located at a second region of the housing. The system further includes a heating reservoir that receives water from the first water reservoir or the second water reservoir. The heating reservoir maintains the water at a brewing temperature. The system also includes a first receptacle defined by the housing that is configured to receive a first filter. The system also includes a second receptacle defined by the housing configured to receive a second filter. The system also includes a cavity defined by the housing to position one of a first container and a second container. The system is configured to brew a first volume of hot beverage to fill the first container based on placement of the first filter in the first receptacle and the first volume of water being pumped from the heating reservoir through the first filter. The system is also configured to brew a second volume of hot beverage to fill the second container based on placement of the second filter in the second receptacle and the second volume of water being pumped from the heating reservoir through the second filter.

In a second embodiment, a method is provided for using the system for brewing the hot beverage. The method includes the steps of placing one of the first container and the second container in the cavity and pressing, on a user interface, one of a plurality of buttons. The method further includes pumping, with the first pump, water from the heating reservoir to one of the first filter and the second filter, based on the pressing step. Pressing a first button of the plurality of buttons causes a controller communicatively coupled to the user interface to transmit a first signal to the power source to cause pumping of the first volume of water from the heating reservoir to the first filter. Pressing a second button of the plurality of buttons causes the controller to transmit a second signal to the power source to cause pumping of the second volume of water from the heating reservoir through the second filter. The method further includes filtering the water from the heating reservoir with one of the first filter and the second filter based on the pumping step. The method further includes filling the one of the first container and the second container in the cavity based on the filtering step.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION

A method and system are described for brewing a hot beverage. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of brewing a hot beverage, e.g. coffee, tea, frappucino, latte, espresso, hot chocolate, etc. In other embodiments, the invention is described below in the context of brewing beverages at a hot temperature (e.g. in a range from about 190 degrees F. to about 205 degrees F.) or at a room temperature (e.g. in a range from about 68 degrees F. to about 72 degrees F.). In still other embodiments, the invention is described below in the context of grinding coffee beans and then using the ground coffee to brew coffee. In still other embodiments, the invention is described below in the context of juicing. In still other embodiments, the invention is described below in the context of coffee filters (e.g. made of biodegradable material).

Figure 1A:
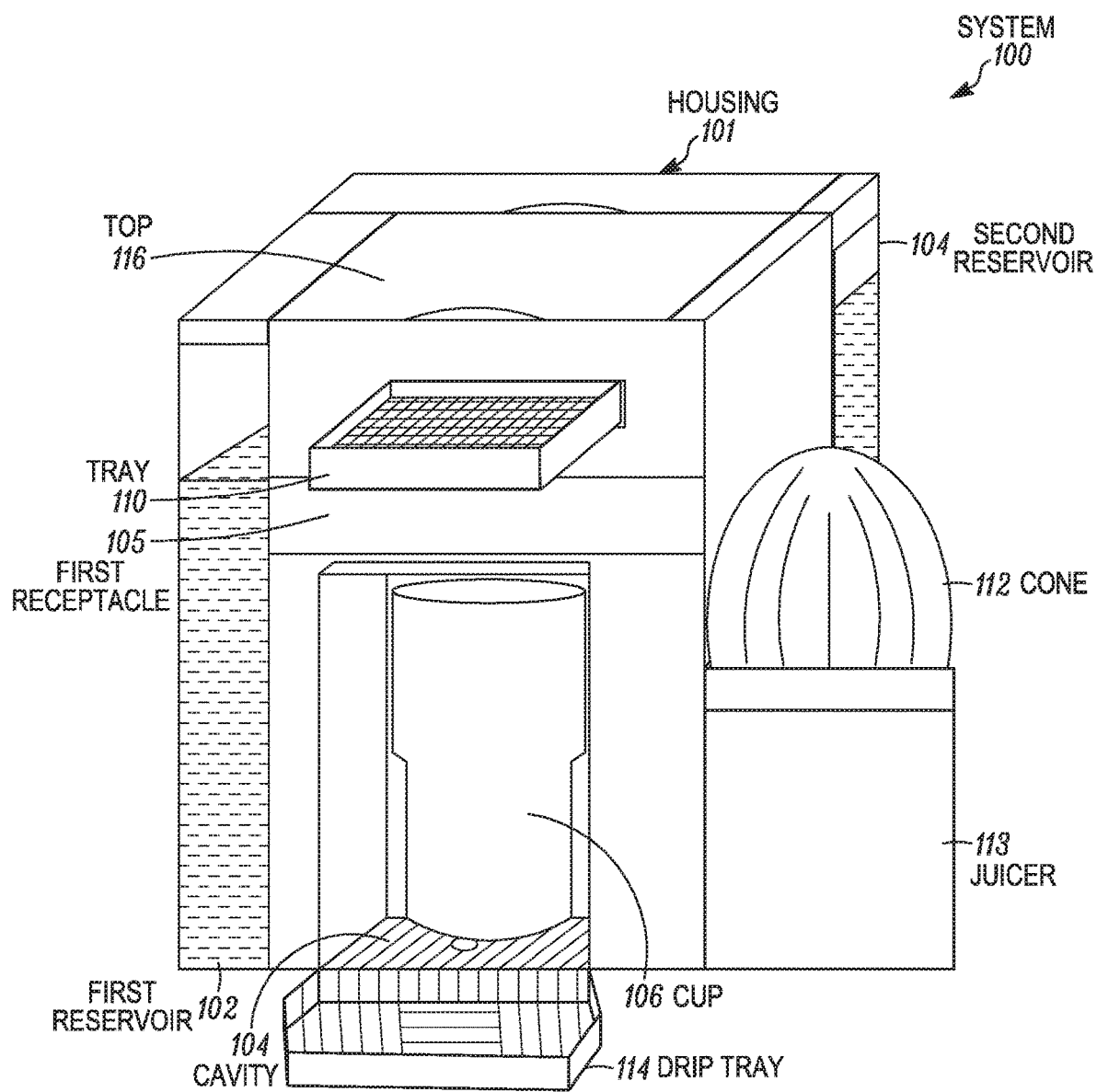
FIG. 1A is an image that illustrates an example of a perspective view of a system for brewing a hot beverage, according to an embodiment.
Figure 1B:
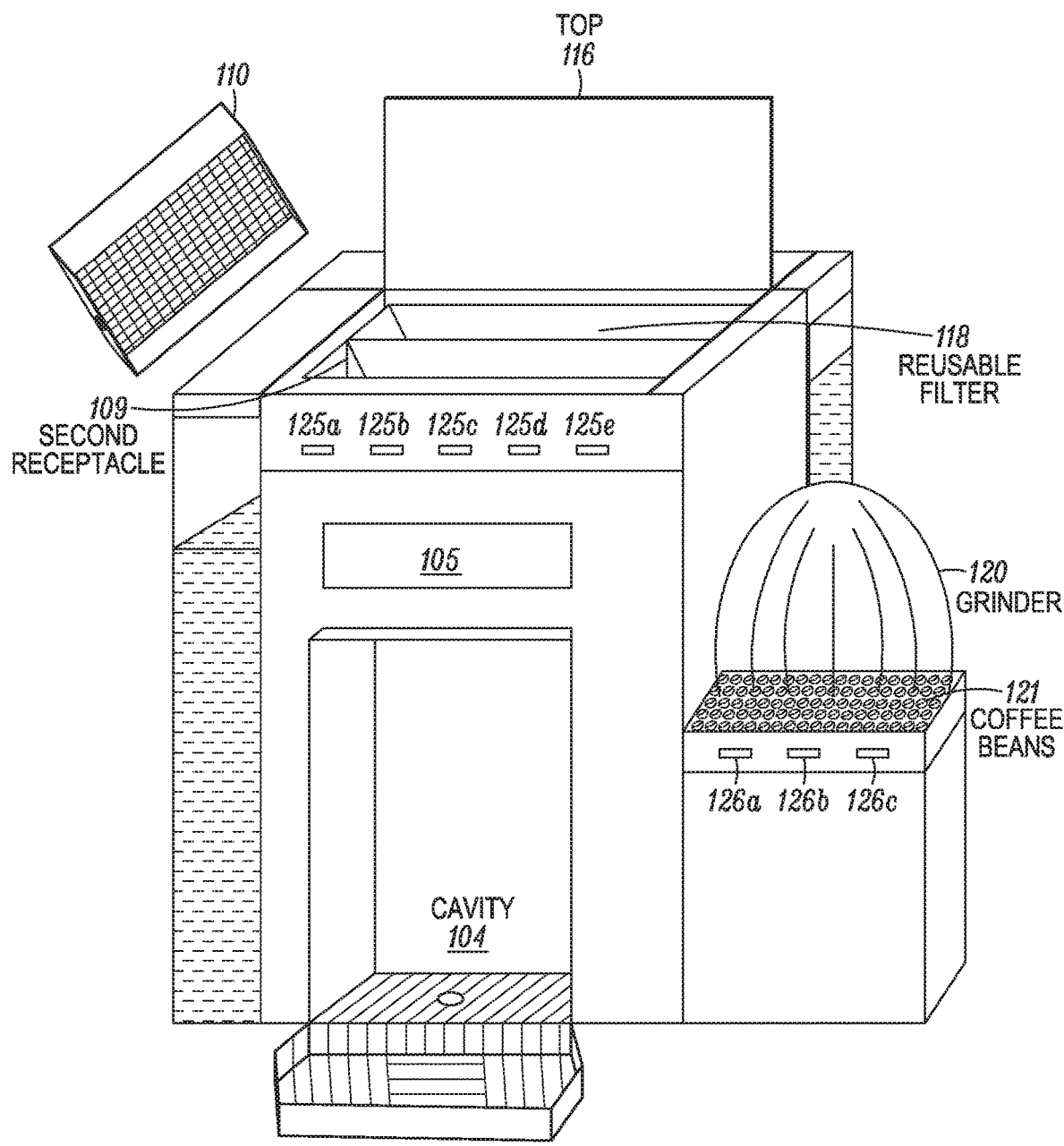
FIG. 1B is an image that illustrates an example of perspective view of the system for brewing a hot beverage of FIG. 1A, according to an embodiment.
Figure 1C:
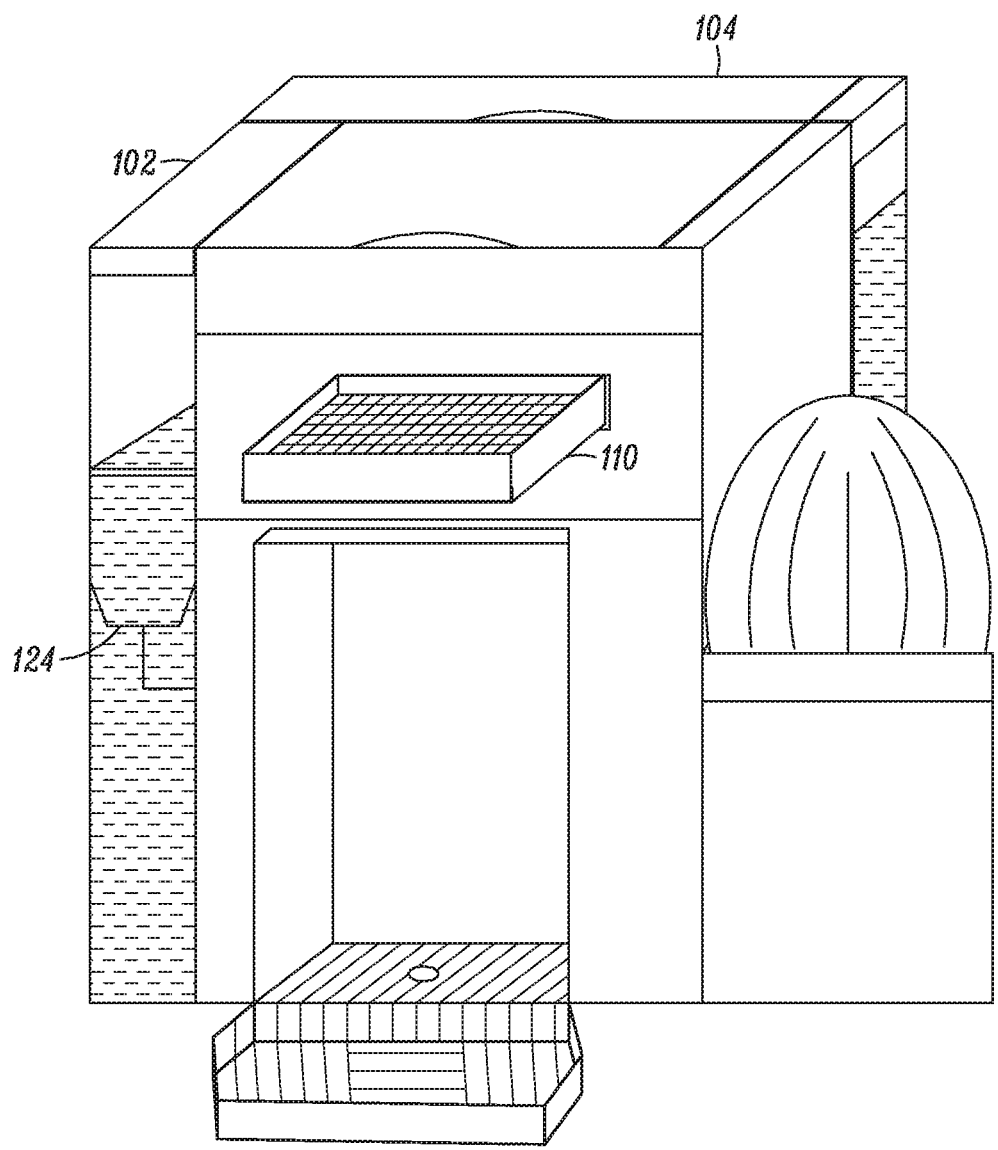
FIG. 1C is an image that illustrates an example of a perspective view of the system for brewing a hot beverage of FIG. 1A, according to an embodiment.
Figure 1D:
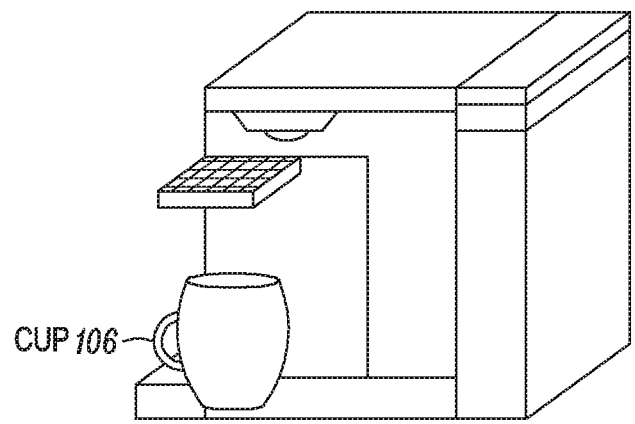
FIG. 1D is an image that illustrates an example of a single serving tray and single serving container placed in the housing of FIG. 1A, according to an embodiment.
Figure 1E:
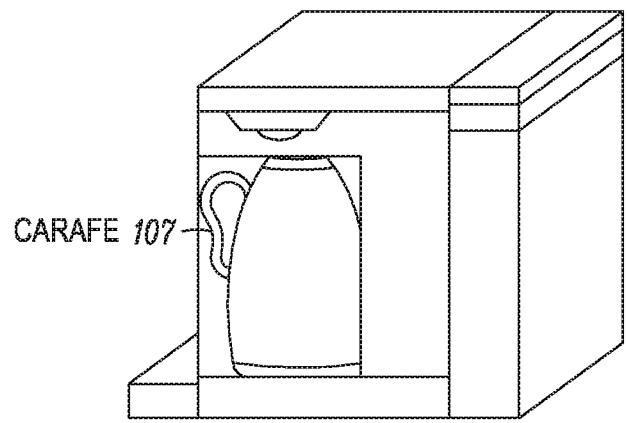
FIG. 1E is an image that illustrates an example of a multiple serving container placed in the housing of FIG. 1A, according to an embodiment.

FIGS. 1A-1C are images that illustrate an example of a perspective view of a system 100 for brewing hot beverages (e.g. coffee), according to an embodiment. In an embodiment, the system 100 includes a housing 101 with a first water reservoir 102 located at a first region (e.g. side) of the housing 101 and a second water reservoir 104 located at a second region (e.g. rear) of the housing 101. In an example embodiment, the water reservoirs 102, 104 are secured to the housing based on a perimeter of the base of the reservoirs 102, 104 being received in a recess (not shown) that is sized and shaped to securely receive the base of the reservoirs 102, 104. In an example embodiment, the water reservoirs 102, 104 have different volumes, such as the first water reservoir 102 has a lesser volume than the second water reservoir 104. In an example embodiment, the volume of the first water reservoir 102 is about 64 ounces or in a range from about 50 ounces to about 80 ounces and the volume of the second water reservoir 104 is about 80 ounces or in a range from about 64 ounces to about 96 ounces. In another example embodiment, the water reservoirs 102, 104 have the same volume. Although FIG. 1A depicts the first water reservoir 102 secured to a first side of the housing 101 and the second reservoir 104 secured to the rear of the housing 101, the embodiments of the invention is not limited to this arrangement and includes the reservoirs 102, 104 being secured to any different regions of the housing 101. Additionally, although two water reservoirs 102, 104 are depicted, in other embodiments more than two water reservoirs may be featured. In an embodiment, each water reservoir 102, 104 features a lid that is sized to be removably placed on a top of the water reservoir 102, 104, to cover the water reservoir 102, 104.

In an embodiment, the first water reservoir 102 is positioned at a first region (e.g. a side of the housing 101), the second water reservoir 104 is positioned at a second region (e.g. a rear of the housing 101). In another embodiment, the first water reservoir 102 and/or second water reservoir 104 includes a water filter 115 to filter undesired chemicals from the water. In addition, in one embodiment, the housing 101 defines a cavity 104 in a front of the housing 101 opposite to the rear of the housing 101, where the cavity 104 is defined to position one of a first container (e.g. cup 106 for single serving of coffee, such as a Yeti® container and/or container with a volume in a range from about 8 oz to about 30 oz) or a second container (e.g. carafe 107 for multiple servings of coffee and/or a standard coffee pot and/or with a volume in a range from about 6 cups to over 12 cups). In an example embodiment, the cavity 104 is sized based on the second container, since the second container has larger dimensions (e.g. width, height, etc.) than the first container. In some embodiments, the first container is designed for a user to consume a hot beverage (e.g. coffee) from whereas the second container is designed not for direct consumption of the hot beverage (e.g. coffee) but instead to fill a smaller container (e.g. cup 106). In other embodiments, the cavity 104 is defined in other portions of the housing 101 besides the front of the housing 101 (e.g. in the side of the housing 101). In some embodiments, a drip tray 114 is provided below the cavity 104 to collect any coffee that overflows from the container. In an example embodiment, a slot (not shown) is provided in a base of the housing 101 and is sized to slidably receive the drip tray 114.

In another embodiment, the system 100 includes a first receptacle 105 defined by the housing 101. The first receptacle 105 is configured to receive a first filter 108 (e.g. FIGS. 3D-3E) comprising one of ground coffee, ground tea, or any particulate substance to brew the hot beverage (e.g. hot chocolate powder, ground espresso, etc.). In an embodiment, the first receptacle 105 is a slot defined by the housing 101 and the system 100 includes a tray 110 (e.g grating on which the first filter is placed) which is sized based on one or more dimensions of the slot. In other embodiments, the slot defined by the first receptacle 105 is sized based on the first filter 108 (e.g. FIGS. 3D-3E) and the tray 110 is omitted such that the first filter 108 is configured and sized to be directly placed into the slot. In an example embodiment, the slot of the first receptacle 105 is positioned above the cavity 104 and the first filter 108 is made from biodegradable material and/or one or more seals along one or more edges of the first filter 108.

In some embodiment, the system 100 includes a hand-held impulse sealer as disclosed in U.S. Provisional Application No. 62/281,372 ('372 application) filed on 1 Mar. 2019 and U.S. application Ser. No. 16/803,847 ('847 application) filed on 27 Feb. 2020, both of which are incorporated by reference herein. In one embodiment, a hand-held impulse sealer, such as disclosed in the '372 application and '847 application is used to form one or more seals 308 along the one or more edges of the first filter 108 (e.g. FIGS. 3D-3E). In this example embodiment, after the hand-held impulse sealer is used to form the first filter 108, when the user wants to brew a single serving of coffee, the first filter 108 is placed on the tray 110 and the tray 110 is inserted in the first receptacle 105. In other embodiments, the first filter 108 is directly placed in the first receptacle 105 without the tray 110.

Figure 1F:
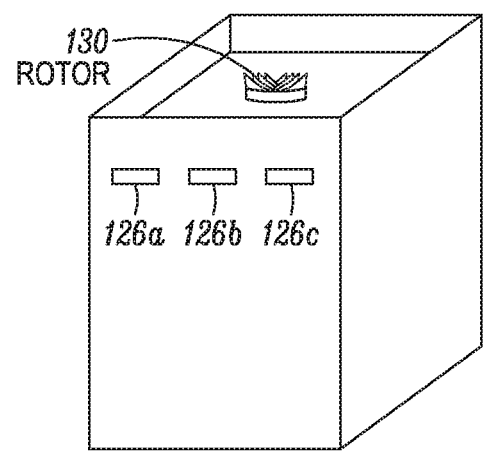
FIG. 1F is an image that illustrates an example of a rotor of the system of FIG. 1A to attach accessory containers, according to an embodiment.
Figure 1G:
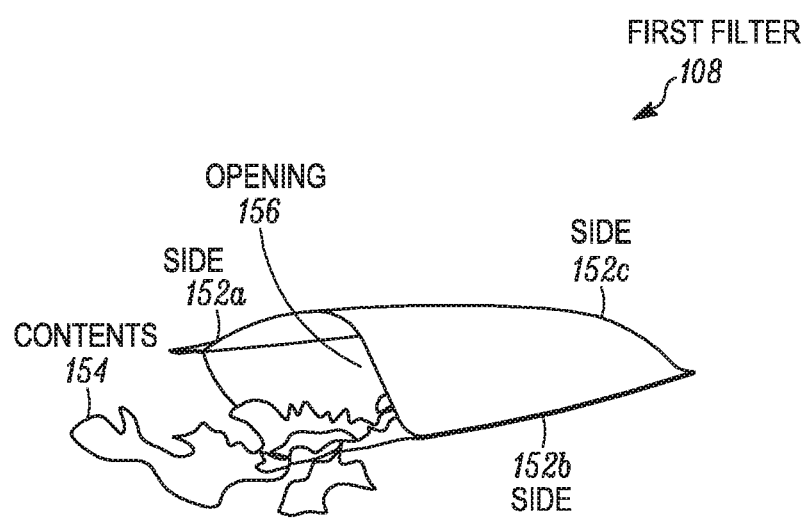
FIG. 1G is an image that illustrates an example of a filter formed from biodegradable material and used in the system of FIG. 1A, according to an embodiment.
Figure 3A:
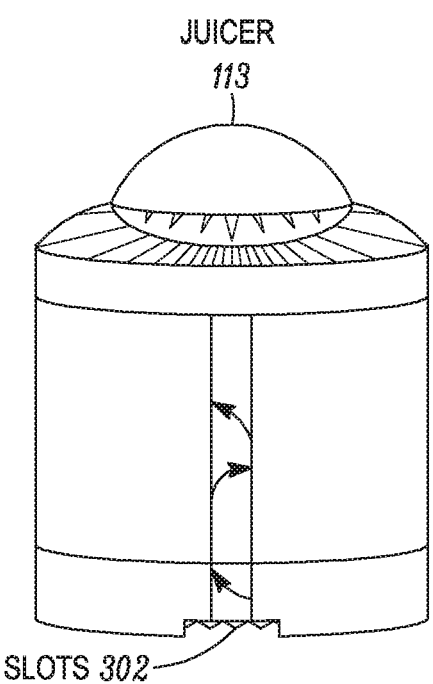
FIGS. 3A-3C and 3G are images that illustrate an example of plan views of accessory containers to be secured to the rotor of FIG. 1F, according to an embodiment.
Figure 3B:
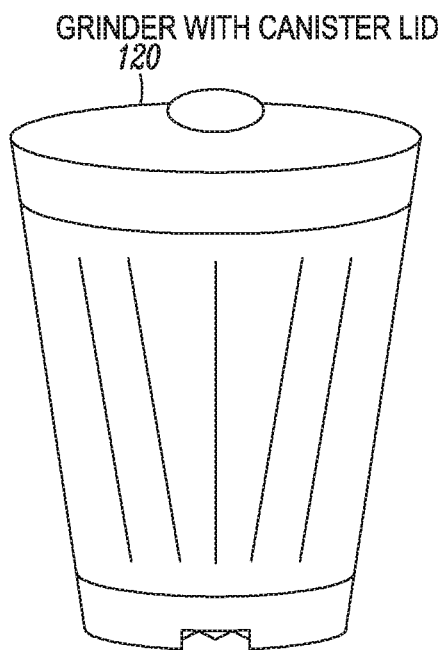
Figure 3C:
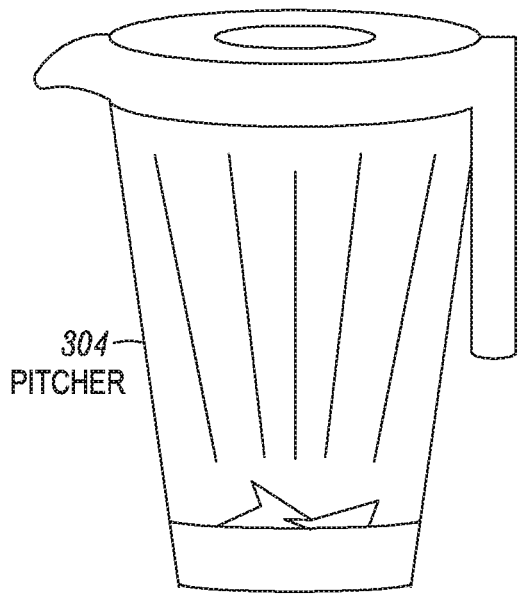
Figure 3D:
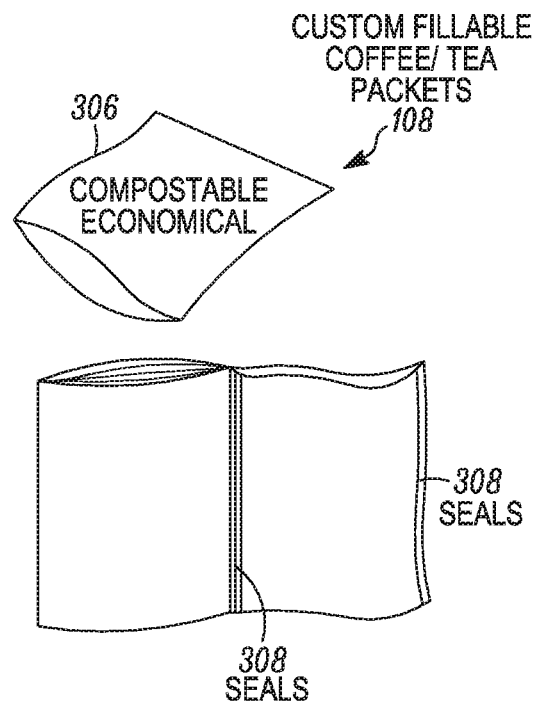
FIGS. 3D-3E are images that illustrate an example of a perspective view of custom made filters with seals to be used with the system of FIG. 1A, according to an embodiment.
Figure 3E:
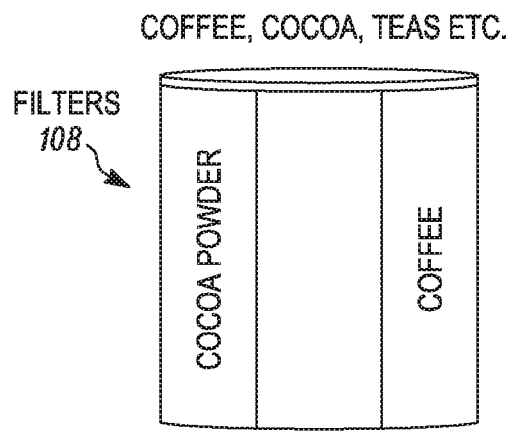
Figure 3F:
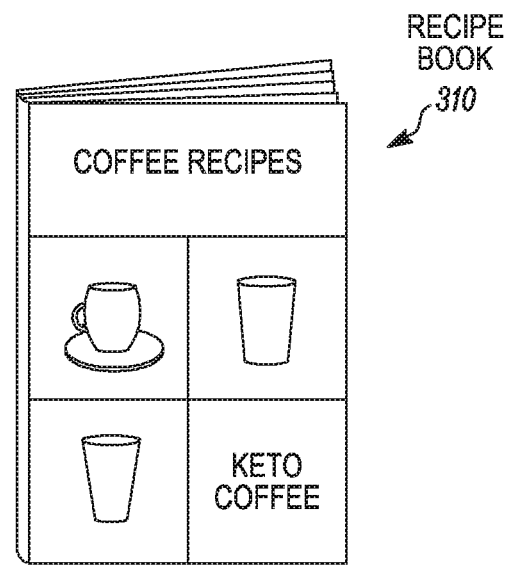
FIG. 3F is an image that illustrates an example of a recipe book to be used with the system of FIG. 1A, according to an embodiment.

In some embodiments, as depicted in FIG. 3D the hand-held impulse sealer disclosed in the '372 application and '847 application can be used to form a single first filter 108, such as by placing ground coffee or tea in a plastic enclosure and forming seals 308 along edges of the first filter 108. In a further embodiment, a cutting element of the hand-held impulse sealer can be used to cut the biodegradable material along or outside the seals 308, so to form a single filter 108 for use in the first receptacle 105. In other embodiments, as shown in FIGS. 3D-3E, the hand-held impulse sealer can be used to simultaneously form multiple filters 108 at once, where the filters 108 are separated by adjacent seals 308, and the hand-held impulse sealer does not cut and separate the filter 108 until a desired time for use with the system 100 to brew coffee. In an embodiment, the filters will be on a roll and pre-perforated. In this embodiment, the filters are pre-sealed on multiple (e.g. 3) sides and open on a perforated edge for filling. In an example embodiment, the filters can be sealed with the hand-held impulse sealer after they are filled. In one example embodiment, the filters come in three sizes to fill (e.g. one for single cup, one for 4-6 cups and another for 10-12 cup). FIG. 1G is an image that illustrates an example of a filter 108 formed from biodegradable material and used in the system 100 of FIG. 1A, according to an embodiment. In an embodiment, the filter 108 is pre-sealed across the sides 152a, 152b, 152c. Contents 154 (e.g. ground coffee, tea leaves, etc.) are inserted into an opening 156 defined by a fourth side of the filter 108. After inserting the contents 154 through the opening 156, the hand-held impulse sealer is used to seal the filter 108 across the fourth side (e.g. the side opposite the side 152c in FIG. 1G). In other embodiments, more than one seal along more than one edge of the filter 108 can be formed with the hand-held impulse sealer.

As disclosed in the '372 application and the '847 application, in some embodiments the hand-held impulse sealer includes a plurality of spaced apart heating elements and a cutting element. In an example embodiment, the slot of the first receptacle 105 defines a rectangular or square cross-section and the edges or seals 308 of the first filter 108 define a rectangular or square shaped filter configured to fit in the rectangular or square cross-section of the slot of the first receptacle 105. In another example embodiment, the amount of ground coffee or tea placed in the first filter 108 and/or the size of the first filter 108 is adjusted so to filter a volume of water to fill the first container (e.g. cup 106) for a single serving of coffee.

In an embodiment, the system 100 includes a second receptacle 109 (FIG. 1B). In one embodiment, the second receptacle 109 is covered by a top 116 of the housing 101. In some embodiments, the second receptacle 109 is accessed by removing and/or rotating the top 116 of the housing 101 from a closed position (FIG. 1A) to an open position (FIG. 1B). In an embodiment, the second receptacle 109 is configured to receive a second filter 118 (FIG. 1B) comprising ground coffee or tea or any ground material used to filter the hot beverage (e.g. hot chocolate powder). In some embodiments, the second filter 118 is a reusable filter, such as a filter made from metal material and/or with openings that are sufficiently small so that ground coffee can be placed in the second filter 118 and water filters through the ground coffee without the ground coffee passing through the filter openings. In other embodiments, the second filter 118 is similar to the first filter 108 but larger in dimension. In one embodiment, the second receptacle 109 is accessed by removing the top 116 of the housing 101 and the second filter 118 is a reusable filter. However, in other embodiments, the second receptacle 109 is positioned in a region of the housing 101 other than the top 116 (e.g. side region, back region, etc.). In another embodiment, the second filter 118 is sized so that it is capable of filtering a second volume of coffee based on multiple servings of coffee and the second container 107 (e.g. carafe or coffee pot) is sized for the multiple servings of coffee.

Figure 3G:
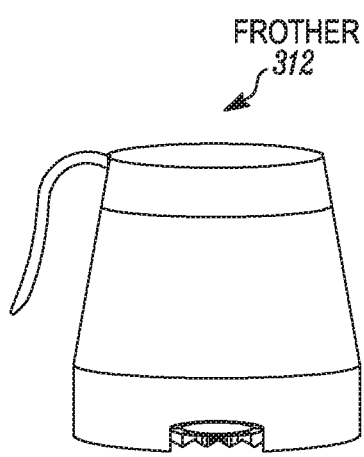
Figure 3H:
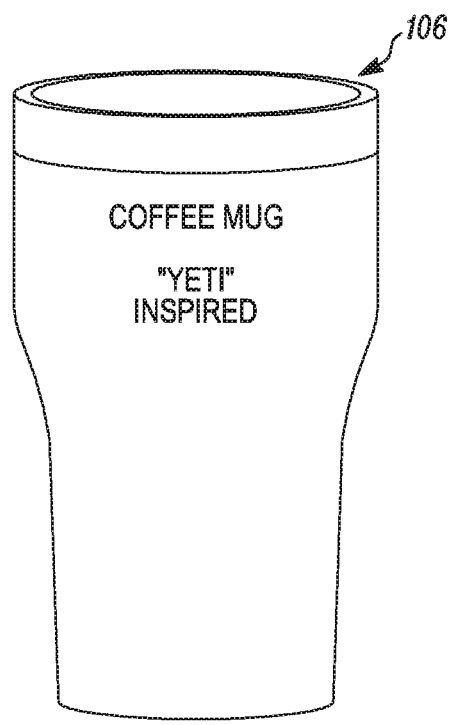
FIG. 3H is an image that illustrates an example of a plan view of a single serving container to be used with the system of FIG. 1A, according to an embodiment.
Figure 3I:
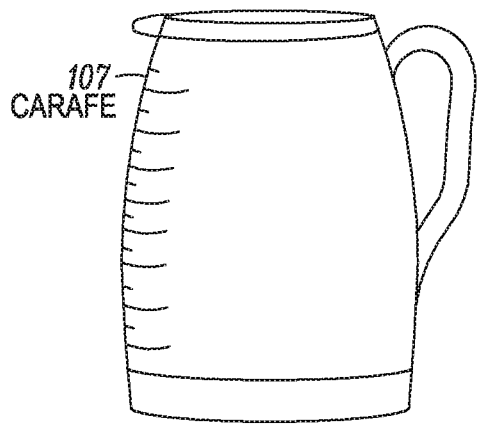
FIG. 3I is an image that illustrates an example of a plan view of a multiple serving container to be used with the system of FIG. 1A, according to an embodiment.

In an embodiment, the system 100 also includes a rotor 130 (FIG. 1F) located at a third region (e.g. second side of the housing 101 opposite the first side where the first reservoir 102 is located) of the housing 101. In one embodiment, the rotor 130 is configured to rotate about a rotational axis and is configured to rotatably engage an accessory container (e.g. juicer 113 in FIG. 1A) to rotate a rotary component (e.g. cone 112) of the accessory container about the rotational axis. In an example embodiment, the rotor 130 causes the cone 112 of the juicer 113 to rotate so that a user can press a fruit (e.g. orange) onto the rotating cone 112 and collect juice in the juicer 113. In other embodiments, the accessory container is a coffee grinder 120 (FIG. 1B) where the rotary component is a blade to grind coffee beans 121 positioned in the coffee grinder 120. In some embodiments, the user places coffee beans 121 in the coffee grinder 120, activates the grinder 120 to grind the coffee beans 121 and subsequently places the ground coffee in one of the first filter 108 and/or second filter 118. In other example embodiments, the accessory container is a pitcher 304 (FIG. 3C) with a rotating blade to blend ingredients placed inside the pitcher 304. In still other example embodiments, the accessory container is a frother 312 (FIG. 3G) to generate a frothing foam of coffee or other liquid (e.g. milk and/or coffee and milk mixture, etc.) placed within the frother 312. FIGS. 3A-3B illustrate example embodiments of the juicer 113 and coffee grinder 120 previously discussed. In one example embodiment, the rotor 130 features a plurality of male grooves (e.g. six grooves) that are configured to be received in a plurality of corresponding slots at a base of the accessory container (e.g. female slots) so that the accessory container is rotatably engaged by the rotor 130. In some embodiments, the system 100 includes one or more of the accessory containers listed above. In other embodiments, the system 100 includes all of the accessory containers discussed above.

Figure 5A:
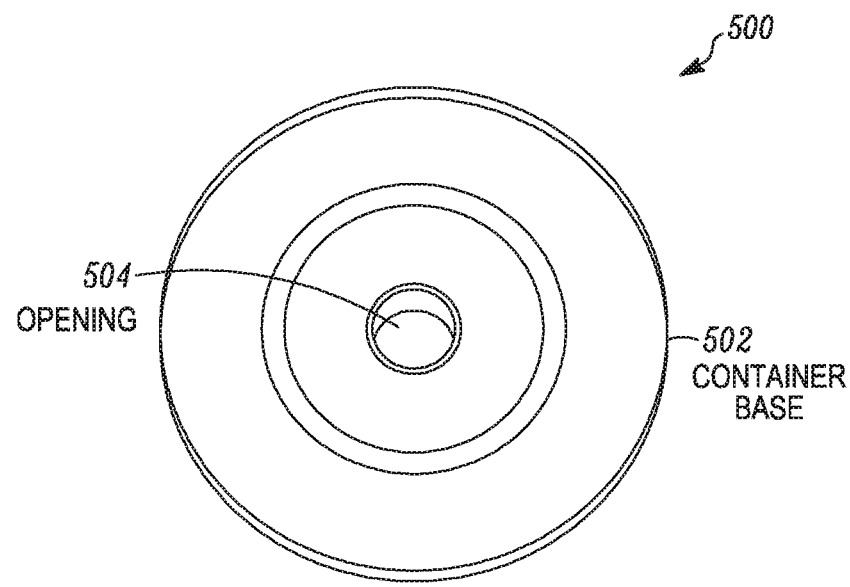
FIG. 5A is an image that illustrates an example of a bottom view of a base of an accessory container to be secured to a rotor of a system for brewing a hot beverage, according to an embodiment.
Figure 5B:
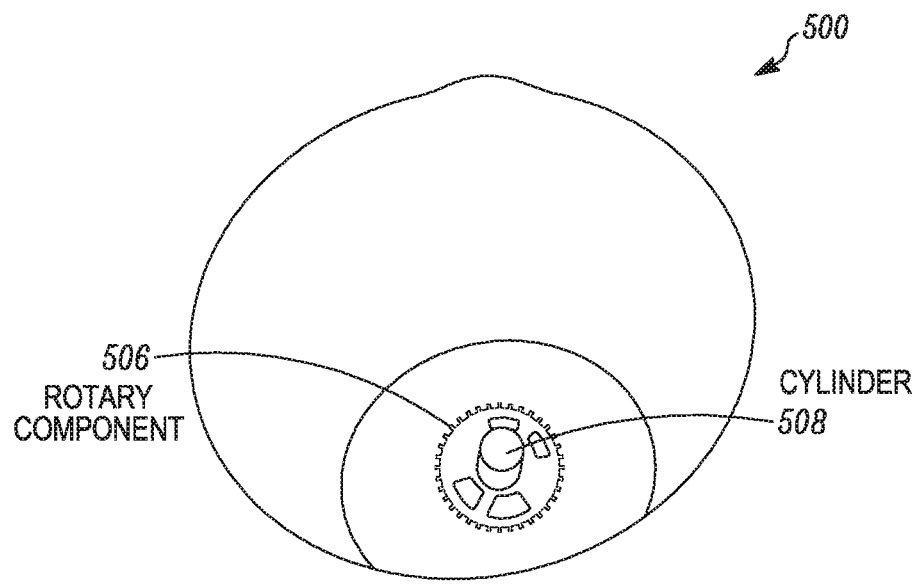
FIG. 5B is an image that illustrates an example of a top perspective view of a rotary component within the accessory container of FIG. 5A, according to an embodiment.
Figure 5C:
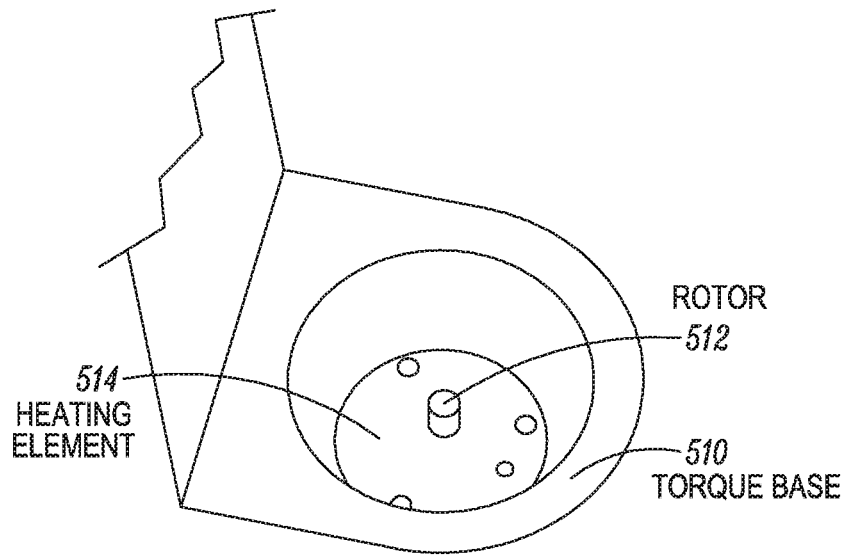
FIG. 5C is an image that illustrates an example of a perspective view of a rotor and torque base of the system to secure the accessory container of FIG. 5A, according to an embodiment.
Figure 5D:
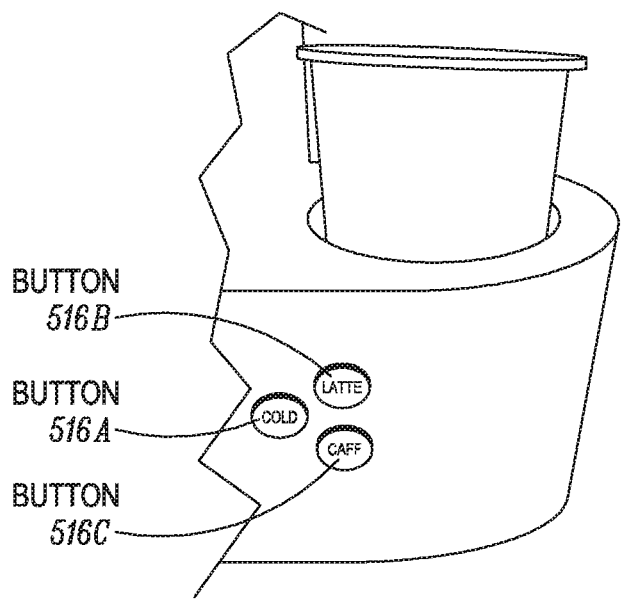
FIG. 5D is an image that illustrates an example of a side view of the torque base of FIG. 5C, according to an embodiment.

FIG. 5A is an image that illustrates an example of a bottom view of a base 502 of an accessory container 500 to be secured to a rotor of a system for brewing a hot beverage, according to an embodiment. FIG. 5B is an image that illustrates an example of a top perspective view of a rotary component 506 (e.g. wheel) within the accessory container 500 of FIG. 5A, according to an embodiment. FIG. 5C is an image that illustrates an example of a perspective view of a rotor 512 and torque base 510 of the system to secure the accessory container of FIG. 5A, according to an embodiment. FIG. 5D is an image that illustrates an example of a side view of the torque base 510 of FIG. 5C, according to an embodiment. In some embodiments, the container 500 and torque base 510 are made from metallic and/or thermally conductive material. In an embodiment, the torque base 510 can be used in place of the torque base of FIGS. 1A, 1F. In one embodiment, the torque base 510 differs from the torque base of FIGS. 1A, 1F in the following respects. The torque base 510 includes a rotor 512 that matingly engages the opening 504 in the base 502 of the container 500 and is received in the cylinder 508 of the container 500. In an example embodiment, rotation of the rotor 512 causes the rotary component 506 (e.g. wheel) to rotate contents of the container 500. In an embodiment, the torque base 510 includes a heating element 514 that contacts and/or provides heat to contents of the container 500 through the base 502 of the container 500 when the container 500 is placed in the torque base 510 (FIG. 5D).

In an example embodiment, a panel is provided on a side of the torque base 510 with one or more settings to select one or more operating modes of the system. In an embodiment, a first button 516a is for a cold mode that activates the rotor 512 without activating the heating element 514 so that the contents of the container 500 are spun (e.g. by the wheel) for a predetermined time (e.g. about 2 minutes or in a range from about 1 minute to about 3 minutes). In another embodiment, a second button 516b is for a latte mode which activates the rotor 512 and the heating element 514 and causes the rotor 512 to spin for a predetermined time (e.g. about 90 seconds or in a range from about 45 seconds to about 120 seconds) and/or the heating element 514 to rise in temperature and/or to cause an increase in the contents (e.g. milk, espresso, etc.) of the container 500 (e.g. to about 145F-150F). In some embodiments, the volume of milk is about ¾ cup or in a range from about ½ cup to about 2 cups in the container 500. In another embodiment, a third button 516c is for a cappuccino mode which activates the rotor 512 and the heating element 514 and causes the rotor 512 to spin for a predetermined time (e.g. about 120 seconds or in a range from about 80 seconds to about 160 seconds) and/or the heating element 514 to rise in temperature and/or to cause contents of the container 500 (e.g. milk, espresso, sugar, etc.) to rise in temperature (e.g. to about 145F-150F). In an example embodiment, the volume of milk is about ½ cup or in a range from about ¼ cup to about 1½ cups. In yet another embodiment, a further button (not shown) is provided to activate a soup mode that causes the rotor 512 to spin the contents of the container 500 (e.g. soup mix and/or soup ingredients) for a predetermined time (e.g. about 7 minutes) and/or to activate the heating element 514 to cause the temperature of the contents of the container 500 to rise to a threshold temperature (e.g. between about 190F and about 220F). In this embodiment, the soup mode is deactivated and the rotor 512 stops spinning the contents and/or the heating element 514 is deactivated after the temperature of the contents of the container 500 reach the threshold temperature.

Figure 2:
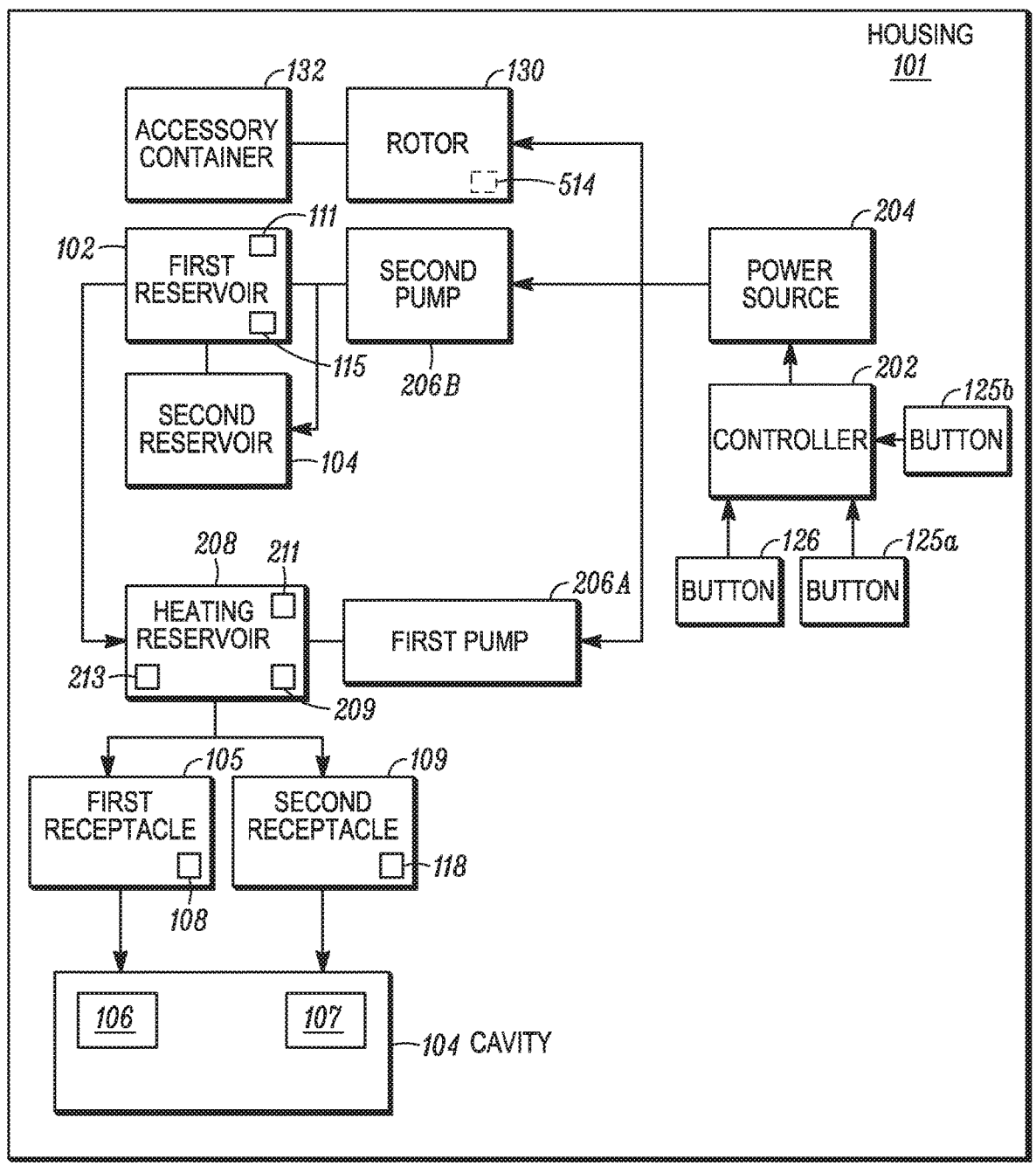
FIG. 2 is a block diagram that illustrates an example of the system for brewing a hot beverage of FIG. 1A, according to an embodiment.

FIG. 2 is a block diagram that illustrates an example of the system 100 for preparing a heated beverage (e.g. filtering coffee, tea, etc.) of FIG. 1A, according to an embodiment. The housing 101 of the system 100 includes a controller 202 communicatively coupled to a power source 204. The system 100 also includes a heating reservoir 208 that receives water from the first water reservoir 102 and/or the second water reservoir 104, where the heating reservoir 208 maintains the water at a brewing temperature (e.g. boiling temperature of water or within a threshold temperature of the boiling temperature). In an example embodiment, a temperature sensor 209 is provided to measure a temperature of the water within the heating reservoir 208 and transmit data indicating the sensed temperature to the controller 202. In another example embodiment, a heating element 211 is also provided in the heating reservoir 208. In one embodiment, when the controller 202 determines (e.g. based on data from the temperature sensor 209) that the temperature of the water in the heating reservoir 208 is less than the brewing temperature, the controller 202 transmits a signal to the heating element 211 to increase the temperature of the water in the heating reservoir 208 to the brewing temperature.

As depicted in FIG. 2, when a user wants the system 100 to brew coffee into the first container 106 via the first receptacle 105, the user first places the first filter 108 in the first receptacle 105. In some embodiments, the user uses the hand-held impulse sealer of the '372 application and the '847 application to form the first filter 108 using biodegradable material and ground coffee or other ground material (e.g. tea). The user then initiates the filtering process of the coffee into the first container 106. In some embodiments, the user initiates the filtering process by pressing a first button 125a on a user panel. In other embodiments, the user initiates the filtering by a different means (e.g. transmitting a signal to the controller 202 from a device that is in wireless communication with the system 100, such as an app on a smartphone). The user initiation of the filtering process causes a signal to be sent to the controller 202, which in turn transmits a signal to the power source 204 and the power source 204 causes a first pump 206A to pump hot water from the heating reservoir 208 to the first receptacle 105 with the first filter 108. The controller 202 causes the power source 204 to transmit electrical power to the first pump 206A for a duration so that a first volume of water (e.g. in a range from about 8 oz to about 30 oz) is pumped to the first receptacle 105 and through the first filter 108 into the first container 106 (e.g. Yeti® container).

As depicted in FIG. 2, in other embodiments a user wants the system 100 to brew coffee into the second container 107 via the second receptacle 109. In some embodiments, the user first places ground coffee in the second filter 118 and places the second filter 118 in the second receptacle 109. In other embodiments, the user places already ground coffee (e.g. not ground using the system 100) in the second filter 118 and places the second filter 118 in the second receptacle 109. In some embodiments, the user places ground coffee in the metal reusable filter 118 and/or removes the first filter 108 from the first receptacle 105 (e.g. in the event that the first filter 108 is within the first receptacle 105). The user then initiates the filtering of the coffee into the second container 107. In some embodiments, the user initiates the filtering process by pressing a second button 125b on a user panel. In other embodiments, the user initiates the filtering by a different means (e.g. transmitting a signal to the controller 202 from a device that is in wireless communication with the system 100, such as an app on a smartphone). The user initiation of the filtering process causes a signal to be sent to the controller 202, which in turn transmits a signal to the power source 204 and the power source 204 causes a first pump 206A to pump hot water from the heating reservoir 208 to the second receptacle 109 with the second filter 118. The controller 202 causes the power source 204 to transmit electrical power to the first pump 206A for a duration so that a second volume of water (e.g. in a range from about 6 cups to about 12 cups) is pumped to the second receptacle 109 and through the second filter 118 into the second container 107 (e.g. carafe).

In some embodiments, the controller 202 transmits a signal to the power source 204 so that the power source 204 causes a second pump 206B to pump water from the first reservoir 102 and/or second reservoir 104 to the heating reservoir 208, to ensure that the heating reservoir 208 is at a threshold (e.g. full) level. In some embodiments, the controller 202 transmits this signal to the power source 204 after the first pump 206A pumps water from the heating reservoir 208 to the first receptacle 105 or second receptacle 109. In other embodiments, the controller 202 transmits this signal whenever the controller 202 determines that the level of water in the heating reservoir 208 is below a threshold level (e.g. about 50% full or in a range from about 30% full to about 90% full and/or in a range from about 1% full to about 99% full). In some embodiments, the heating reservoir 208 has a level sensor 213 which transmits a signal to the controller 202 with data that indicates a level of water in the heating reservoir 208. Upon receiving this signal from the level sensor 213, the controller 202 compares the indicated level of water in the heating reservoir 208 with the threshold level (e.g. stored in a memory of the controller 202). Based on this comparison, if the controller 202 determines that the level of water in the heating reservoir 208 is below the threshold level, the controller 202 subsequently sends the signal to the power source 204 in order to pump water to the heating reservoir 208 until the level of water in the heating reservoir 208 is back at the threshold level. Additionally, if the controller 202 determines that the level of water in the heating reservoir 208 is above the threshold level, the controller 202 does not send the signal to the power source 204.

In yet another embodiment, the first reservoir 102 has a level sensor 111 that transmits data indicating a level of water in the first reservoir 102 to the controller 202. In one embodiment, the controller 202 compares the level of water in the first reservoir 102 with a low threshold level of water in the reservoir 102 (e.g. stored in a memory of the controller 202). In an example embodiment, the low threshold level is about 20% or in a range from about 10% to about 50% and/or in a range from about 1% to about 70%). When the controller 202 determines that the level of water in the first reservoir 102 (e.g. based on the signal from the level sensor 111) is below the low threshold level, the controller 202 transmits a signal to the power source 204 to cause the second pump 206B to pump water from the second reservoir 104 to the first reservoir 102 until the level of water in the first reservoir 102 is at or above the low threshold level. Thus, in this example embodiment the second reservoir 104 is provided as a backup reservoir to the first reservoir 102. The inventor recognized that providing multiple reservoirs 102, 104 has notable advantages, such as reducing the frequency at which the user has to refill the water reservoirs.

In some embodiments, the rotor 130 is electrically coupled to the same power source 204 within the housing 101 as the first and second pumps 206A, 206B. In other embodiments, the rotor 512 of FIG. 5C is connected to the system in a similar manner as the rotor 130 depicted in FIG. 2. In an example embodiment, the power source 204 is sufficient to simultaneously power the rotor 130 and the pumps 206A, 206B. In another example embodiment, the power source 204 can power either the rotor 130 or the pumps 206A, 206B and thus when the power source 204 is powering one of the rotor and pumps, the other of the rotor and pumps is not used (e.g. the controller 202 is programmed such that multiple signals are not transmitted to the power source 204 to simultaneously power the rotor and pump(s)). In one embodiment, a plurality of buttons 126 are provided on the user panel. In an example embodiment, the user presses a first button 126a (FIG. 1F) to cause the controller 202 to transmit a signal to the power source 204 which causes the rotor 130 to rotate at a first rotational speed. In an example embodiment, the user presses a second button 126b (FIG. 1F) to cause the controller 202 to transmit a signal to the power source 204 which causes the rotor 130 to rotate at a second rotational speed different from the first rotational speed. In an example embodiment, the user presses a third button 126c (FIG. 1F) to cause the controller 202 to transmit a signal to the power source 204 which causes the rotor 130 to rotate at a third rotational speed different from the first and second rotational speeds. As appreciated by one of ordinary skill in the art, the user can press one of the three buttons 126a, 126b, 126b, based on the particular accessory container that is being used on the rotor 130 and/or based on the particular ingredients being chopped/cut/ground/etc within the accessory container. Although FIG. 1B depicts three buttons 126a through 126c on the user panel, the system is not limited to this particular button arrangement and can include less or more than three buttons (e.g. less or more than three rotational speeds). In an example embodiment, the first rotational speed, the second rotational speed and the third rotational speeds have respective values that are sufficient to process the different contents of the container as desired by the user (e.g. grind the coffee beans, juice the fruit applied to the juicer 113, froth the foam using the frother 312, etc) which are appreciated by one of ordinary skill in the art.

Figure 4:
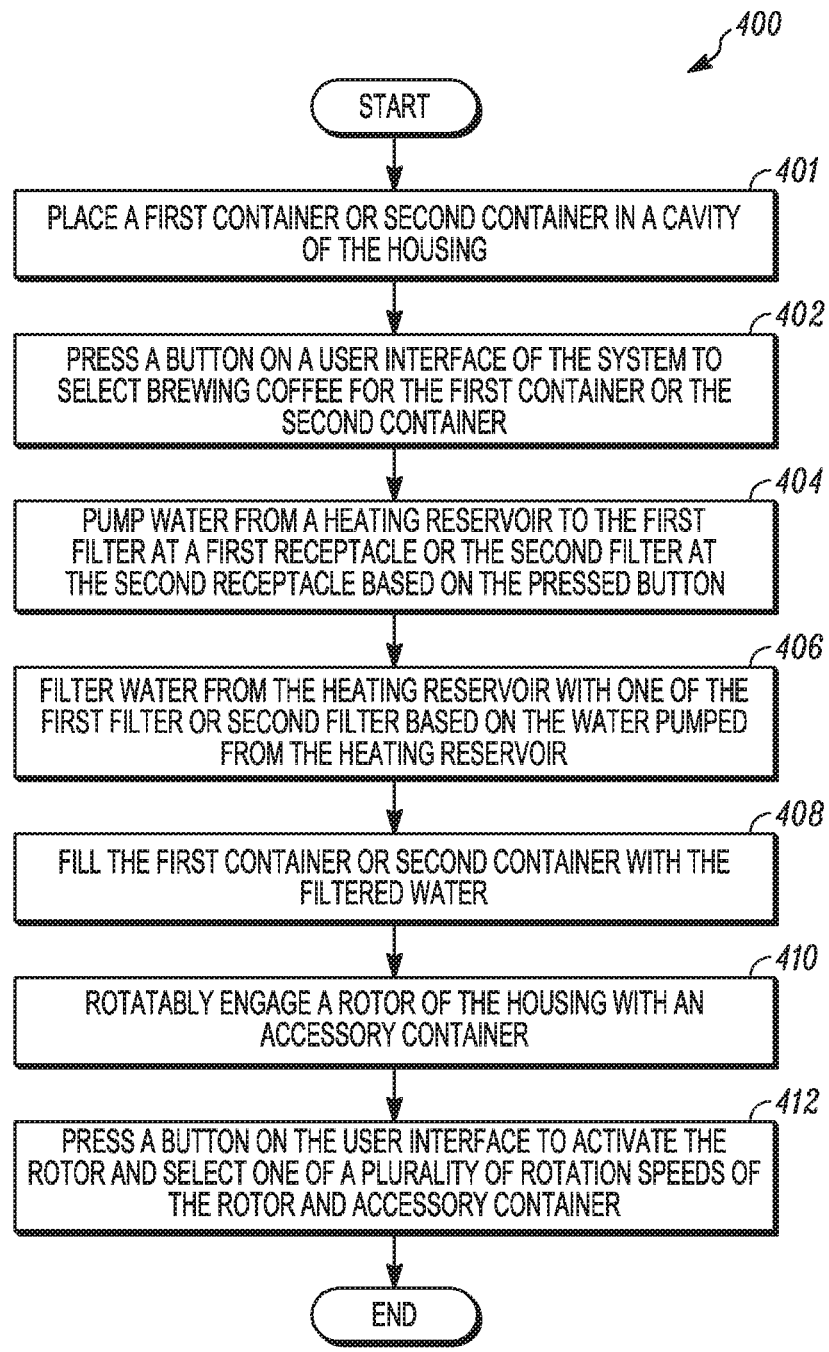
FIG. 4 is a flow chart that illustrates an example of a method for using the system of FIG. 1A, according to an embodiment.

As depicted in FIG. 4, a flowchart is depicted that provides a method 400 for operating the system 100.

Although the flowchart of FIG. 4 depicts particular steps in a particular order, in some embodiments the steps may be arranged in a different order and/or one or more steps may be omitted and/or additional steps may be included.

In an embodiment, step 401 involves the user placing the first container 106 or second container 107 in the cavity 104 of the housing 101. In an example embodiment, the user places the first container 106 or second container 107 in the cavity 104, based on whether the user wants to have a single serving or multiple serving of hot beverage (e.g. coffee, tea, etc.) brewed by the system 100. Additionally, in one embodiment in step 401 the user places the first filter 108 in the first receptacle 105 or the second filter 118 in the second receptacle 109 (after filling the filter with ground coffee).

In an embodiment, the user uses the hand-held impulse sealer of the '372 application and the '847 application in step 401 to make the first filter 108 or second filter 118 by first placing ground coffee in an enclosure formed by biodegradable material and applying the hand-held impulse sealer along the edges of the biodegradable material to form the seals 308 along the edges of the filter. In some embodiments, in step 401 the first filter 108 and/or second filter 118 can be formed by the hand-held impulse sealer using material other than biodegradable material (e.g. plastic material). In this example embodiment of step 401, the user applies the hand-held impulse sealer to the biodegradable material so that the seals 308 are formed along the filter in accordance with one or more dimensions of the first receptacle 105 (e.g. for the first filter 108) or the second receptacle 109 (e.g. for the second filter 118). In an example embodiment, for the first receptacle 105 defined by a square or rectangular slot, the user in step 401 uses the hand-held impulse sealer to form seals 308 along the first filter 108 based on the dimensions of the slot so that the first filter 108 is a square or rectangular shaped filter in accordance with the square or rectangular shaped slot. In an example embodiment, first filter 108 has dimensions of about 2.5 inches long by about 2.5 inches wide (e.g. small size filter 108) and/or about 5 inches long by about 5 inches long (e.g. large size filter 118). In an example embodiment, the slot of the first receptacle 105 has dimensions of about 3 inches wide and about 4-5 inches long and/or a height of about ¾ inch. In an example embodiment, a base of the first receptacle 105 features the tray 110 (e.g. grate) to allow water to flow through to a a funnel-type apparatus (e.g. which then subsequently passes the filtered water to the container 106). FIG. 1G is an image that illustrates an example of the filter 108 formed from biodegradable material and used in the system 100 of FIG. 1A, according to an embodiment. In an example embodiment, the cutting element of the hand-held impulse sealer in the '372 application and '847 application is used to cut the biodegradable material along the seals 308 so to form the first filter 108 and/or separate the first filter 108 from remaining bulk amount of biodegradable material. In an embodiment, the biodegradable material discussed herein involves biodegradable material with openings sufficient for hot water to filter through the material for purposes of filtering the ground coffee within the first filter 108.

In an embodiment, in step 402 the user presses one of the buttons 125a, 125b based on whether the user wants the system 100 to brew coffee to the first container 106 or second container 107. In other embodiments, in step 402 the user initiates the filtering process using a device in wireless communication with the controller 202 and system 100 (e.g. with an app on a smartphone) which transmits a signal to the controller 202 to indicate whether the user wants coffee to be brewed in the first container 106 or the second container 107. In an embodiment, in step 404 the controller 202 and power source 204 causes the first pump 206A to pump water from the heating reservoir 208 through the first filter 108 in the first receptacle 105 or the second filter 118 in the second receptacle 109, depending on which button 125a, 125b was pressed (or based on the signal received by the controller 202 from the device in wireless communication with the controller 202) in step 402.

In an embodiment, in step 406 the water pumped in step 404 from the heating reservoir 208 to the first receptacle 105 is filtered by the ground coffee in the first filter 108 or the water pumped from the heating reservoir 208 to the second receptacle 109 is filtered by the ground coffee in the second filter 118. In another embodiment, in step 408 the filtered water in step 406 fills either the first container 106 or the second container 107, depending on which button was pressed in step 402.

In an embodiment, in step 410 an accessory container (e.g. juicer 113, coffee grinder 120, pitcher 304, etc.) is rotatably engaged to the rotor 130. In an example embodiment, in step 410 a plurality of slots in a base of the accessory container engage a plurality of grooves of the rotor 130. As appreciated by one of ordinary skill in the art, the accessory container is positioned on the rotor so that the grooves of the rotor securely engage the slots in the base of the accessory container, so that the rotor 130 can effectively rotate a rotary component of the accessory container. In an embodiment, in step 412, the user presses one or more buttons 126a, 126b, 126c to activate the rotor 130 at a selective rotation speed, in order to use the accessory container for a number of purposes (e.g. use the grinder 120 to grind coffee beans 121 to be used in the filters 108, 118; use the juicer 113 to press fruit onto the rotating cone 112 to draw juice into the juicer 113, etc.). In some embodiments, steps 410 and 412 can be performed prior to steps 402-408 and/or can be performed without performing steps 402-408 such that the rotor 130 can be used independent of the brewing features of the system 100.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the items, elements or steps modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

What is claimed is:

1. A system, comprising:
   a housing;
   a first water reservoir located at a first region of the housing;
   a second water reservoir located at a second region of the housing;

a heating reservoir in fluid communication with the first and second water reservoir to receive water from at least one of the first water reservoir and second water reservoir, wherein the heating reservoir is configured to maintain the water at a brewing temperature;

a first receptacle in fluid communication with the heating reservoir, said first receptacle defined by the housing, said first receptacle configured to receive a first filter comprising ground coffee;

a second receptacle in fluid communication with the heating reservoir, said second receptacle defined by the housing, said second receptacle configured to receive a second filter comprising ground coffee; and a cavity in fluid communication with the first and second receptacle, said cavity defined by the housing to position one of a first container and a second container;

wherein the system is configured to brew a first volume of coffee to fill the first container based on placement of the first filter in the first receptacle and the first volume of water being pumped from the heating reservoir through the first filter; and wherein the system is configured to brew a second volume of coffee to fill the second container based on placement of the second filter in the second receptacle and the second volume of water being pumped from the heating reservoir through the second filter;

wherein the first region is a side of the housing and the second region is a rear of the housing and wherein the cavity is defined by a front of the housing opposite from the rear of the housing.

2. The system of claim 1, wherein the first region is a side of the housing and the second region is a rear of the housing and wherein the cavity is defined by a front of the housing opposite from the rear of the housing.

3. The system of claim 1, wherein the first receptacle is a slot defined by the housing positioned above the cavity and wherein the first filter comprises biodegradable material and one or more seals along one or more edges of the first filter.

4. The system of claim 3, further comprising a hand-held impulse sealer configured to form the one or more seals along the one or more edges of the first filter.

5. The system of claim 4, wherein the hand-held impulse sealer comprises a plurality of spaced apart heating elements and a cutting element and wherein the slot defines one of a rectangular and square cross-section and wherein the edges of the first filter define a rectangular or square shaped filter configured to fit in the rectangular or square cross-section of the slot.

6. The system of claim 3, wherein the first filter is sized so that the first volume of coffee is a single serving of coffee and the first container is a single cup sized for the single serving of coffee.

7. The system of claim 1, wherein the second receptacle is accessed by removing a top of the housing and wherein the second filter is a reusable filter.

8. The system of claim 7, wherein the reusable filter is made from metallic material and wherein the second filter is sized so that the second volume of coffee is multiple servings of coffee and the second container is a pot sized for the multiple servings of coffee.

9. A system, comprising:
a housing;
a first water reservoir located at a first region of the housing;
a second water reservoir located at a second region of the housing;
a heating reservoir in fluid communication with the first and second water reservoir to receive water from at least one of the first water reservoir and second water reservoir, wherein the heating reservoir is configured to maintain the water at a brewing temperature;
a first receptacle in fluid communication with the heating reservoir, said first receptacle defined by the housing, said first receptacle configured to receive a first filter comprising ground coffee;
a second receptacle in fluid communication with the heating reservoir, said second receptacle defined by the housing, said second receptacle configured to receive a second filter comprising ground coffee;
a cavity in fluid communication with the first and second receptacle, said cavity defined by the housing to position one of a first container and a second container; and
a rotor located at a third region of the housing, said rotor configured to rotate about a rotational axis and wherein the rotor is configured to rotatably engage an accessory container to rotate a rotary component of the accessory container about the rotational axis:
wherein the system is configured to brew a first volume of coffee to fill the first container based on placement of the first filter in the first receptacle and the first volume of water being pumped from the heating reservoir through the first filter; and
wherein the system is configured to brew a second volume of coffee to fill the second container based on placement of the second filter in the second receptacle and the second volume of water being pumped from the heating reservoir through the second filter.

10. The system of claim 9, further comprising:
a power source;
a first pump configured to pump water from the heating reservoir to at least one of the first receptacle and the second receptacle, wherein the first pump is electrically coupled to the power source to receive electrical power to pump water;
and wherein the rotor is electrically coupled to the power source to receive electrical power and rotate about the rotational axis.

11. The system of claim 10, wherein the power source is positioned within the housing and wherein the rotor comprises a plurality of grooves configured to fit into a plurality of slots adjacent a base of the accessory container, and wherein the system further comprises the accessory container, wherein the accessory container comprises at least one of a blender, a juicer, a food processor and a coffee bean grinder.

12. The system of claim 11, further comprising the blender, the juicer, the food processor and the coffee bean grinder.

13. The system of claim 9, wherein the first region is a first side of the housing, the second region is a rear of the housing, the third region is a second side of the housing opposite from the first region and wherein the cavity is defined by a front of the housing opposite from the rear of the housing.

14. The system of claim 10, further comprising:
a user interface comprising a plurality of buttons; and
a controller communicatively coupled with the power source and each of the plurality of buttons;
wherein the controller is configured to transmit a first signal to the power source to cause the first pump to pump water from the heating reservoir to the first receptacle upon a first button of the plurality of buttons being pressed;

and wherein the controller is configured to transmit a second signal to the power source to cause the first pump to pump water from the heating reservoir to the second receptacle upon a second button of the plurality of buttons being pressed.

15. The system of claim 14, further comprising a second pump communicatively coupled to the power source and the controller, said second pump configured to pump water from the first reservoir to the heating reservoir upon the first button of the plurality of buttons being pressed and further configured to pump water from the second reservoir to the heating reservoir upon the second button of the plurality of buttons being pressed.

16. The system of claim 14, wherein the plurality of buttons further include one or more secondary buttons that indicate one or more rotation speeds of the rotor and wherein the controller is configured to transmit a first speed signal to the power source to cause the rotor to rotate at a first speed upon one secondary button being pressed that indicates the first speed and wherein the controller is further configured to transmit a second speed signal to the power source to cause the rotor to rotate at a second speed different than the first speed upon one secondary button being pressed that indicates the second speed.

17. A method of using the system of claim 10, comprising:
providing the system including the housing, the first water reservoir located at the first region of the housing, the second water reservoir located at the second region of the housing and the heating reservoir in fluid communication with the first and second reservoir to receive water from at least one of the first water reservoir and the second water reservoir;
placing one of the first container and the second container in the cavity;
pressing, on a user interface, one of a plurality of buttons;
pumping, with the first pump, water from the heating reservoir to one of the first filter and the second filter, based on the pressing step, wherein pressing a first button of the plurality of buttons causes a controller communicatively coupled to the user interface to transmit a first signal to the power source to cause pumping of the first volume of water from the heating reservoir to the first filter and wherein pressing a second button of the plurality of buttons causes the controller to transmit a second signal to the power source to cause pumping of the second volume of water from the heating reservoir through the second filter;
filtering, the water from the heating reservoir with one of the first filter and the second filter based on the pumping step; and
filling the one of the first container and the second container in the cavity based on the filtering step.

18. The method of claim 17, wherein the plurality of buttons further include one or more secondary buttons that indicate one or more rotation speeds of the rotor and wherein the controller is configured to transmit a first speed signal to the power source to cause the rotor to rotate at a first speed upon one secondary button being pressed that indicates the first speed and wherein the controller is further configured to transmit a second speed signal to the power source to cause the rotor to rotate at a second speed different than the first speed upon one secondary button being pressed that indicates the second speed.

19. The method of claim 17, further comprising:
forming, with a handheld impulse sealer, one or more seals along one or more edges of the first filter, wherein the first filter is made from biodegradable material, receptacle.

20. A system, comprising:
a housing;
a first water reservoir located at a first region of the housing;
a second water reservoir located at a second region of the housing;
a heating reservoir in fluid communication with the first and second water reservoir to receive water from at least one of the first water reservoir and second water reservoir, wherein the heating reservoir is configured to maintain the water at a brewing temperature;
a first receptacle in fluid communication with the heating reservoir, said first receptacle defined by the housing, said first receptacle configured to receive a first filter comprising ground coffee;
a second receptacle in fluid communication with the heating reservoir, said second receptacle defined by the housing, said second receptacle configured to receive a second filter comprising ground coffee;
a cavity in fluid communication with the first and second receptacle, said cavity defined by the housing to position one of a first container and a second container;
a level sensor configured to measure a level of water in the first reservoir;
a controller communicatively coupled to the level sensor to receive first data indicating the level of the water in the first reservoir, to compare the first data with second data indicating a low level threshold of the water in the first reservoir and to transmit a signal based on the comparison of the first data and the second data; and
a pump communicatively coupled to the controller, wherein the pump is configured to pump water from the second reservoir to the first reservoir based on receiving the signal from the controller wherein the system is configured to brew a first volume of coffee to fill the first container based on placement of the first filter in the first receptacle and the first volume of water being pumped from the heating reservoir through the first filter; and
wherein the system is configured to brew a second volume of coffee to fill the second container based on placement of the second filter in the second receptacle and the second volume of water being pumped from the heating reservoir through the second filter.

\* \* \* \* \*